United States Patent
Wu

(10) Patent No.: US 8,229,225 B2
(45) Date of Patent: Jul. 24, 2012

(54) CANDIDATE SELECTION METHOD FOR HANDWRITING INPUT

(76) Inventor: Yingchao Wu, Guangdong Province (CN)

( * ) Notice: Subject to any disclaimer, the term of this patent is extended or adjusted under 35 U.S.C. 154(b) by 1114 days.

(21) Appl. No.: 12/116,174

(22) Filed: May 6, 2008

(65) Prior Publication Data

US 2009/0279782 A1  Nov. 12, 2009

(51) Int. Cl.
*G06K 9/00* (2006.01)
*G06K 9/34* (2006.01)
*G06K 9/72* (2006.01)

(52) U.S. Cl. ............ 382/187; 382/179; 382/229
(58) Field of Classification Search .......... 382/187, 382/179, 229
See application file for complete search history.

(56) References Cited

U.S. PATENT DOCUMENTS

| | | | | | |
|---|---|---|---|---|---|
| 5,257,074 | A | * | 10/1993 | Kamei | 382/187 |
| 5,812,697 | A | * | 9/1998 | Sakai et al. | 382/186 |
| 6,028,970 | A | * | 2/2000 | DiPiazza et al. | 382/309 |
| 6,275,612 | B1 | * | 8/2001 | Imoto | 382/189 |
| 6,363,347 | B1 | * | 3/2002 | Rozak | 704/244 |
| 6,618,504 | B1 | * | 9/2003 | Yoshino | 382/187 |
| 7,720,316 | B2 | * | 5/2010 | Shilman et al. | 382/311 |
| 7,996,769 | B2 | * | 8/2011 | Fux et al. | 715/257 |
| 2002/0064316 | A1 | * | 5/2002 | Takaoka | 382/305 |
| 2004/0057619 | A1 | * | 3/2004 | Lim et al. | 382/182 |
| 2004/0140956 | A1 | * | 7/2004 | Kushler et al. | 345/168 |
| 2005/0234722 | A1 | * | 10/2005 | Robinson et al. | 704/257 |
| 2005/0249419 | A1 | * | 11/2005 | Rieman | 382/229 |
| 2006/0062471 | A1 | * | 3/2006 | Xu et al. | 382/186 |
| 2006/0114239 | A1 | * | 6/2006 | Nakajima | 345/173 |
| 2006/0149549 | A1 | * | 7/2006 | Napper | 704/257 |
| 2007/0189613 | A1 | * | 8/2007 | Tanaka | 382/229 |
| 2008/0056578 | A1 | * | 3/2008 | Shilman et al. | 382/186 |
| 2008/0150910 | A1 | * | 6/2008 | Nakajima | 345/173 |
| 2008/0195388 | A1 | * | 8/2008 | Bower et al. | 704/243 |
| 2008/0243737 | A1 | * | 10/2008 | Rieman et al. | 706/18 |
| 2008/0270111 | A1 | * | 10/2008 | Hanumanthappa | 704/3 |
| 2010/0302164 | A1 | * | 12/2010 | Pienimaa et al. | 345/168 |

* cited by examiner

*Primary Examiner* — Kathleen Y Dulaney

(57) ABSTRACT

A method for handwriting input includes recognizing a first character inputted by handwriting; providing a plurality of recognition results each with a code based on the recognition of the first character; recognizing a second character inputted by handwriting; and determining the first character based on the recognition of the second character. A handwriting input system for carrying out the method is also provided.

11 Claims, 1 Drawing Sheet

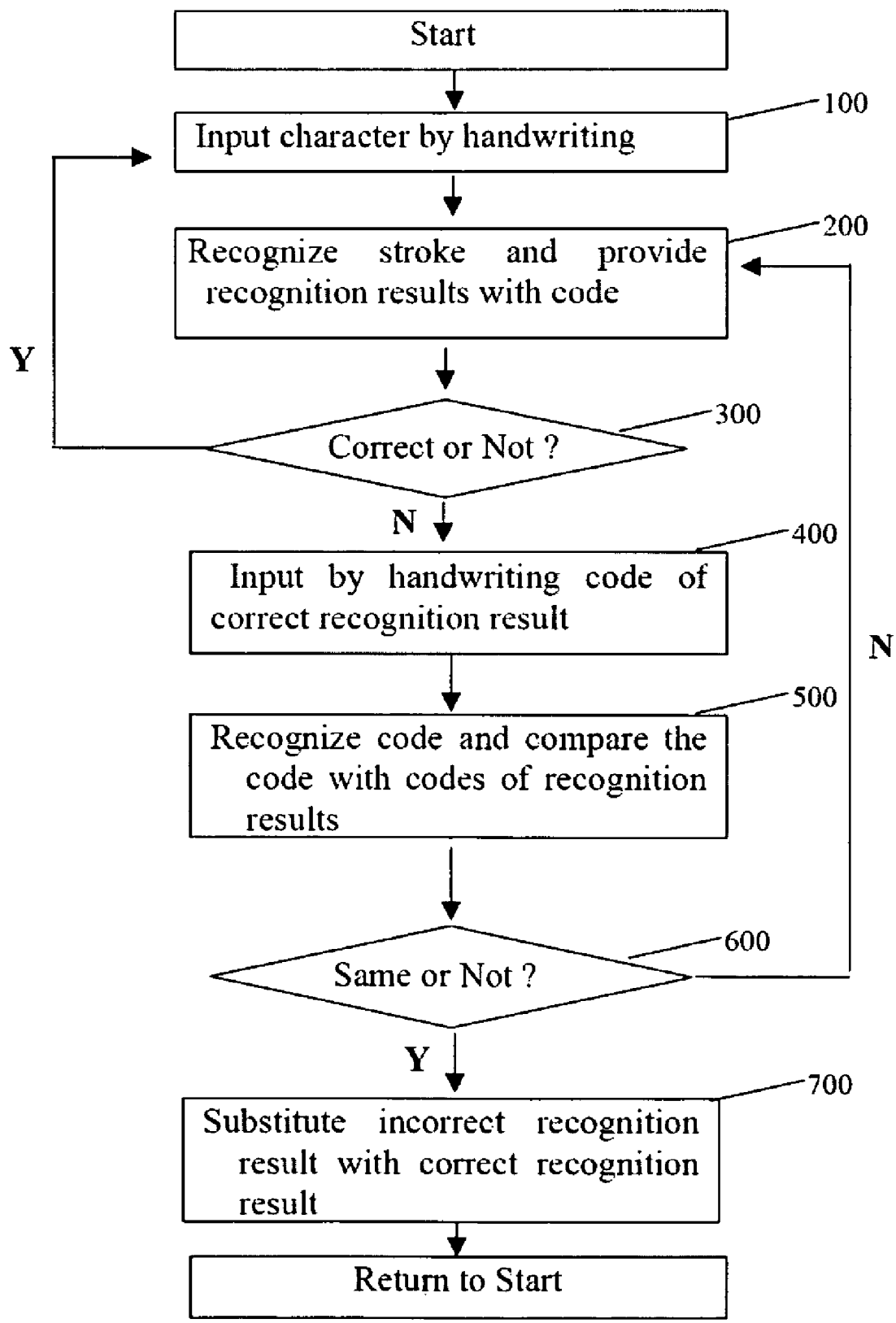

CANDIDATE SELECTION METHOD FOR HANDWRITING INPUT

BACKGROUND OF THE INVENTION

The present invention relates to a handwriting input method, and more particularly, to a candidate selection method for handwriting input.

As an input method, handwriting input has been widely used in a variety of information terminal devices. In handwriting input, handwritten strokes are recognized as a character or a command by an algorithm of pattern recognition. Due to the variations in drawing the strokes and the imperfectness of the recognition capability, it can be difficult for handwriting software to correctly recognize the handwritten input information all the time. For this reason, when displaying the recognized character, the handwriting software typically provides several candidates for user's selection. When selection of the character is performed in a handwriting manner, a typical method is to designate a dedicated key or place the candidates in a designated area that can be click selected such that the user can make a selection by pressing the key or clicking the candidates. In these methods, however, the user is required to accurately locate the key and the click selection area and, therefore, both the user's attention and the handwriting pen may move away from a handwriting area. After the selection, the user needs to move his/her attention and the handwriting pen back to the handwriting area for handwriting of further information. During the handwriting process, the user may have to move his/her attention and handwriting pen back-and-forth between the handwriting area and the click selection area or the selection key, which can be very inconvenience and significantly lower the handwriting input speed. What is needed, therefore, is a candidate selection method for handwriting input which can overcome the problem existed in the current handwriting input method.

BRIEF SUMMARY OF THE INVENTION

Embodiments of the present invention provide a candidate selection method for handwriting input which allows the user to more efficiently select the correct character from a plurality of candidates.

In one embodiment, the selection method for handwriting input is carried out as follows.

step a: After a character is inputted by handwriting, handwriting software recognizes the handwritten character and provides a plurality of recognition results each with a code.

step b: If one recognition result which is inputted into an input window as default is correct, further information may be inputted by handwriting. If the recognition result which is inputted as default is incorrect, the code of the correct recognition results is directly inputted by handwriting.

step c: The handwriting software then recognizes the inputted stroke. If the recognized stroke is the same as the code of one of the recognition results generated in step a, which means that the user selects that one of the recognition results, the recognition result inputted in the input window as default is substituted with that one of the recognition results and the method returns to step a.

In the method described above, the handwriting software recognizes the stroke after step b. If the recognized stroke is different from the codes of any recognition results generated in step a, the handwriting software determines the inputted stroke to be a new character input and, therefore, repeats step a.

In various embodiments of the method, the codes of the recognition results in step a may be numbers such as 1, 2, 3, 4..., letters such as A, B, C, D..., or any combination of the above codes such as A1, A2, A3, A4....

In one embodiment, the handwriting software may further provide an audio output function that, when outputting a recognition result, outputs an audio message corresponding to the outputted recognition result for user's reference.

In a further embodiment, the handwriting software provides a phrase memory function that enables the user to select memorized phrases later.

Benefits of the method described above include that, among others, the user's attention and the handwriting pen are always kept in the handwriting area during the handwriting process. As such, selection of the candidates can be achieved without interrupting the handwriting. In addition, whether an input is a selection of candidates or a new information input is determined automatically by the handwriting software without the user's determination, thus achieving a rather smooth handwriting input and greatly enhancing the efficiency of the handwriting software.

BRIEF DESCRIPTION OF THE DRAWINGS

FIG. 1 is a flow chart illustrating the operation of one embodiment of the present method.

DETAILED DESCRIPTION OF THE INVENTION

The present method is carried out by a handwriting input system which includes, but not limited to, a software interaction model, a stroke input module, a stroke recognition module, a results transmit module, a command execute module, and peripherals of the handwriting input system. The software interaction model is used to support various types of handwriting software. The stroke input module allows a user to input a handwritten character and receives the handwritten character. The stroke recognition module is used to recognize the handwritten character inputted by the user. The results transmit module is used to transmit the recognized results to the user. The command execute module is used to execute selection and input command. The peripherals include a handwriting pen, a handwriting panel, and a font database for the input system.

Before the embodiment is described further, it is to be noted that, the character used in the disclosure means any symbol. Thus, a character includes, but not limited to, a letter, a number, a Chinese character, a combination of the above, or the like. While the embodiment is described in connection with handwriting input of Chinese characters, the method may also find utility in handwriting input of characters of other types or countries.

A flow chart of one embodiment of the present method will be described as follows with reference to FIG. 1. As the method starts, a user inputs one or more handwritten characters (step 100), i.e., the user draws one or more characters on a handwriting area. Assuming that the user inputs a English word "TYPE", the stroke recognition module of the handwriting software recognizes the strokes drawn by the user and obtains a recognition result "TVDE", which is inputted into an input window as default, and also obtains a plurality of initial recognition result candidates "TVPE, TYDE, JVDE, TYPE, JYDE, JVPE". Each of the candidates is numbered with a number by the software and is displayed to the user by the result transmit module (step 200). As such, the initial recognition result candidates received by the user are displayed as a message: "1. TVPE 2. TYDE 3. JVDE 4. TYPE 5.

JYDE 6. JVPE". Upon viewing the message, the user determines that the default input recognition result "TVDE" is incorrect (step 300). The user then views other candidates and determines that the candidate "TYPE" with number 4 is the correct result. Thus, the user inputs the number 4 of the correct candidate by handwriting in order to select the correct candidate (step 400). Once number 4 had been inputted, the stroke recognition module recognizes the input stroke as "4", and the present recognition result "4" is compared with the numbers of the initial recognition results (step 500). By this comparison, the software determines that the present recognition result "4" is the same as the number "4" of the candidate "TYPE" among the initial recognition results (step 600), and thereby determines that the user selects the correct candidate, i.e., the word "TYPE". Therefore, the command execute module of the handwriting software substitutes the default input word "TVDE" with the word "TYPE" (step 700). However, after displaying the initial recognition results to the user, if the handwriting software recognizes and determines that the subsequently inputted stroke is different from any one of the numbers of the initial recognition results, the subsequently inputted stroke will be treated as a new character input.

In the exemplary embodiment, each of the recognition result candidates has a number for user's selection. In another embodiment, each recognition result candidate has another type of code for user's selection, such as, a letter, or a combination of a letter and a number.

In one embodiment, the handwriting software may include an audio module programmed to output an audio message corresponding to the handwritten characters to the user, thereby facilitating those visually impaired persons confirming their input or prompting of the correct pronunciation for the handwritten characters to those who are learning pronunciation.

In one embodiment, the present invention further provides a phrase memory function. For example, when a user has continuously inputted the characters "James Smith", the handwriting software will automatically memorize this phrase. If the user correctly inputs the character "James" later, the handwriting software will automatically retrieve and display the phrase "James Smith" as one of the result candidates for user's selection. If the subsequently inputted characters correspond to another phrase "James Kaler", the handwriting software will again memorize the phrase "James Kaler". Later, if the user correctly inputs the character "James", the handwriting software will automatically retrieve and display both the phrase "James Kaler" and the phrase "James Smith" as results candidates for user's selection.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for handwriting input adapted for a handwriting input system, the handwriting input system comprising a stroke input module, a stroke recognition module, an input window, a result transmit module and a command execute module, the method comprising:
the stroke input module receiving a handwriting input of one or more first inputted characters inputted within the input window;
the stroke recognition module recognizing the one or more first inputted characters and obtaining a plurality of recognition results corresponding to the first inputted characters, wherein recognition results from the plurality of recognition results comprise a default recognition result and a plurality of candidate recognition results;
assigning an identification code correspondingly to each of the recognition results, and the result transmit module displaying each of the recognition results together with the corresponding identification code;
the stroke recognition module recognizing one or more second inputted characters inputted within the input window inputted by handwriting; and
the command execute module determining the one or more first characters based on the recognition of the one or more second characters by comparing the one or more second inputted characters with each of the codes.

2. The method of claim 1, wherein the step of comparing the one or more second inputted characters with each of the codes comprises:
determining whether or not one of the codes is identified to be the one or more second inputted characters.

3. The method of claim 2, wherein the step of determining the one or more first characters based on the recognition of the one or more second characters further comprises:
if one of the codes is identified to be the one or more second inputted characters, the result transmit module displays the recognition result corresponding to the identified code.

4. The method of claim 2, wherein the step of determining the one or more first characters based on the recognition of the one or more second characters further comprises:
if none of the codes is identified to be the one or more second inputted characters, the one or more second characters are recognized by the stroke recognition module as a new character input to be displayed by the result transmit module.

5. The method of claim 4, further comprising substituting the default recognition result in the input window with the one of the recognition results upon determining the one of the recognition results is the one or more first characters.

6. The method in accordance with claim 1, wherein the codes correspondingly and respectively displayed with the recognition results are numbers, letters or a combination of numbers and letters.

7. A handwriting input system comprising:
a stroke input module configured to receive drawing of one or more strokes of a first character and a subsequent second character;
a stroke recognition module configured to recognize the first character based on one or more received strokes of the first character and recognize the second character based on one or more received strokes of the second character;
a result transmit module configured to provide a plurality of recognition results each with a corresponding identification code;
a display area displaying each of recognition results from the plurality of recognition results correspondingly with the corresponding code thereof so as to allow a user to identify a correspondence therebetween; and
a command execute module configured to identify whether or not the second character is one of the codes respectively corresponding to the recognition results for determining the first character based on a recognition result of the second character.

8. The handwriting input system of claim 7, wherein the plurality of recognition results comprises one default recognition result and a plurality of other recognition result candidates.

9. The handwriting input system of claim 8, wherein the command execute module is configured to determine that the default recognition result is the first character if the second character is recognized as a new character input that is different from any of the codes of the recognition results.

10. The handwriting input system of claim 9, wherein if the second character is recognized as one of the codes corresponding to one of the recognition results, the one of the recognition results is determined to be displayed as the first character.

11. The handwriting input system of claim 7, wherein the code of the recognition result is selected from the group consisting of a number, a letter or a combination of the above.

* * * * *